(12) United States Patent
O'Connell (10) Patent No.: US 7,059,365 B2
(45) Date of Patent: *Jun. 13, 2006

(54) FUEL TANK FILLER NECK AND METHOD OF MANUFACTURING SAME

(75) Inventor: Patrick R. O'Connell, Rochester Hills, MI (US)

(73) Assignee: Shelby Enterprises, Inc., Romeo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/683,745

(22) Filed: Oct. 10, 2003

(65) Prior Publication Data

US 2004/0074556 A1    Apr. 22, 2004

Related U.S. Application Data

(63) Continuation-in-part of application No. 10/615,485, filed on Jul. 8, 2003, which is a continuation of application No. 09/998,113, filed on Nov. 30, 2001, now Pat. No. 6,588,459, which is a continuation-in-part of application No. 09/454,103, filed on Dec. 3, 1999, now Pat. No. 6,330,893.

(51) Int. Cl.
    *B65B 1/04*    (2006.01)

(52) U.S. Cl. ................. 141/46; 141/286; 220/86.2

(58) Field of Classification Search ........... 141/286, 141/301, 302, 349, 350; 220/86.2
    See application file for complete search history.

(56) References Cited

U.S. PATENT DOCUMENTS

| | | | |
|---|---|---|---|
| 2,319,567 A | 5/1943 | Vegell |
| 2,336,430 A | 12/1943 | Wery |
| 3,044,270 A | 7/1962 | Biever |
| 3,180,376 A | 4/1965 | Sanborn |
| 3,187,936 A | 6/1965 | Downing |
| 3,602,030 A | 8/1971 | Nado et al. |
| 3,979,010 A | 9/1976 | Fiedler et al. |
| 4,034,784 A | 7/1977 | Ball et al. |
| 4,195,673 A | 4/1980 | Johnston et al. |
| 4,204,563 A | 5/1980 | Pyle |
| 4,234,098 A | 11/1980 | Miller et al. |
| 4,386,514 A | 6/1983 | Herten |

(Continued)

FOREIGN PATENT DOCUMENTS

DE    24 52 248    5/1975

(Continued)

OTHER PUBLICATIONS

Carbon steel tubes for machine structural purposes; Japanese Industrial Standard; JIS G 3445: 2004.

(Continued)

*Primary Examiner*—Steven O. Douglas
(74) *Attorney, Agent, or Firm*—Harness, Dickey & Pierce, P.L.C.

(57) ABSTRACT

A fuel tank filler assembly includes a filler neck configured to receive a fuel supply nozzle. The filler neck includes a one-piece seamless funnel member having a tubular body configured to swirl supplied fuel and reduce vapor escape. The tubular body includes integrally formed threads for receiving a gas cap. The funnel member defines in off-set axial relation a relatively large inlet opening adapted for attachment to a receptor for the nozzle and a relatively small necked down outlet opening adapted for attachment to the inlet of a filler tube. The filler tube is in communication with the fuel tank. A method for manufacturing the fuel tank filler neck is also disclosed.

30 Claims, 6 Drawing Sheets

U.S. PATENT DOCUMENTS

| | | |
|---|---|---|
| 4,450,880 A | 5/1984 | Scheurenbrand |
| 4,462,620 A | 7/1984 | Bambenek et al. |
| 4,632,270 A | 12/1986 | Sasaki et al. |
| 4,635,813 A | 1/1987 | Peickert |
| 4,782,974 A | 11/1988 | Elkayam |
| 5,056,570 A | 10/1991 | Harris et al. |
| 5,271,438 A | 12/1993 | Griffin et al. |
| 5,309,961 A | 5/1994 | Franke et al. |
| 5,360,040 A | 11/1994 | Thorn et al. |
| 5,385,179 A | 1/1995 | Bates et al. |
| 5,415,316 A | 5/1995 | Pemberton et al. |
| 5,507,324 A | 4/1996 | Whitley, II et al. |
| 5,590,806 A | 1/1997 | Green et al. |
| 5,673,738 A | 10/1997 | Spaulding |
| D392,020 S | 3/1998 | Fairles |
| 5,735,322 A | 4/1998 | Palvolgyi |
| 5,791,387 A | 8/1998 | Palvolgyi |
| 5,860,460 A | 1/1999 | Hidano et al. |
| 6,289,945 B1 | 9/2001 | Haboush, II |
| 6,336,482 B1 | 1/2002 | Cunkle et al. |
| 6,405,767 B1 | 6/2002 | Marsala et al. |
| 6,523,582 B1 | 2/2003 | Furuta |
| 6,585,015 B1 | 7/2003 | Hughes |
| 2003/0089424 A1 | 5/2003 | Gabbey et al. |

FOREIGN PATENT DOCUMENTS

| | | |
|---|---|---|
| JP | 58-194627 | 12/1983 |
| JP | 60-156964 | 8/1985 |
| JP | 61-125827 | 8/1986 |
| JP | 10-119595 | 12/1998 |

OTHER PUBLICATIONS

Carbon steel tubes for machine structural purposes; Japanese Industrial Standard; JIS G 3445: 1988.

Office Action in Ex Parte Reexamination mailed Sep. 16, 2005 from Examiner Kenneth Bomberg.

Office Action in Ex Parte Reexamination mailed Oct. 11, 2005 from Examiner Kenneth Bomberg.

FUEL TANK FILLER NECK AND METHOD OF MANUFACTURING SAME

CROSS-REFERENCE TO RELATED APPLICATIONS

This application is a continuation-in-part of U.S. patent application Ser. No. 10/615,485 filed on Jul. 8, 2003; which is a continuation of U.S. patent application Ser. No. 09/998,113 filed on Nov. 30, 2001 (now U.S. Pat. No. 6,588,459); which is a continuation-in-part of U.S. patent application Ser. No. 09/454,103 filed on Dec. 3, 1999 (now U.S. Pat. No. 6,330,893). The disclosures of the above applications are incorporated herein by reference.

FIELD OF THE INVENTION

The present invention relates to a fuel tank filler neck connected to a gas tank of an automobile and, in particular, to a seamless fuel tank filler neck with integral threads.

BACKGROUND OF THE INVENTION

Gas tank fuel systems providing reduced gasoline vapor loss are becoming increasingly important in the automobile industry to reduce needless loss of fuel. The typical solution to this problem has been to reduce the diameter of at least a section of the fuel tank filler neck. Though this approach has been somewhat successful, it is limited because as the diameter of the filler neck is decreased, the resistance to flow of the gasoline is increased. The increased resistance causes the fill neck to release any pressure buildup, thereby causing the fuel nozzle to shut off before the fuel tank is full. Another design issue is the permeability of the materials from which the fuel tank system is made. Fuel vapors may diffuse through fuel tank system components fabricated from various types of mild steels. Further, such fuel vapor diffusion increases as the mild steel components corrode over time.

Another disadvantage of current filler neck design is the method by which the inlet of the filler neck is flared in order to provide a sufficient diameter to accept the gas nozzle during refueling. Typically, current filler necks are made by a process of repeated reductions and expansions of a seamed welded tube. Thus, through this mechanical process, there is an increasing tendency for the weld to leak as the tube is structurally weakened and thinner diameter tubes are used. Further, many filler necks require a retainer to be fitted to the inlet end in order to provide a sealing surface and an engageable thread for a gas cap.

SUMMARY OF THE INVENTION

The filler neck for receiving a fuel supply nozzle for a motor vehicle fuel tank includes a one-piece seamless funnel member having an integrally formed sealing surface and integrally formed threads for receiving a gas cap. The funnel member defines in off-set axial relation a relatively large inlet opening supply nozzle and a relatively small necked down outlet opening. The offset relationship of the inlet and outlet opening and tube configuration of the transition therebetween induces a swirling motion in the fuel flow as the fuel proceeds towards the fuel tank. The resultant swirl motion of the flowing fuel leaves an opening through which any pressure buildup in the fuel tank may be vented. The spiraling motion of the fuel continues through the outlet opening and into the filler tube attached thereto, further limiting fuel vapors from escaping during refueling because of an induced suctioning effect or liquid seal that is created by the spiraling motion of the fuel through the relatively narrow passage from the funnel member to the fuel tank.

The relatively larger diameter section forming the inlet opening is axially offset and spaced apart from the relatively smaller diameter tubular section forming the outlet opening. These integrally formed tubular sections are joined through a tapered section that transitions from the large diameter section to the small diameter section in a configuration designed to promote fuel swirl. For example, the tapered section may intersect the larger diameter section at an elliptically-shaped junction that lies in a plane inclined 60–85° from the axis of the tubular sections. Further, the funnel inlet opening may have a diameter $D_1$ and the tubular section may have a diameter $D_2$ with a coaxial offset at a distance X where $0.1D_2$ is less than X which is less than $0.3D_2$, and where $D_1$ is at least one and a half times $D_2$.

This invention also includes a method of manufacturing the filler neck for a motor vehicle fuel tank. Generally, the filler neck is formed by deep-drawing a seamless funnel member and integrally forming threads and a sealing surface. The funnel member includes an enlarged inlet at one end, and a relatively small outlet at the opposite end, wherein a portion of the funnel member is configured to induce a sufficient swirl to create a passage for suctioning fuel vapors to prevent escape during refueling and to provide a vent passage for any pressure buildup in the fuel tank. A length of butt-seam tubing is cut to form a filler tube of desired length. An end of the filler tube is telescopically aligned with the outlet of the funnel member to securely join the funnel and filler tube together. The filler tube is bent to a desired shape. Further, the configuration may be leak tested to verify the integrity of joining the funnel member to the filler tube and the attachment of a nozzle receptor, if any, to the funnel member, and the integrity of the butt-seam joint and the filler tube subsequent to bending. The funnel member may be attached to the filler tube by braising, adhesive bonding, or welding.

DETAILED DESCRIPTION OF THE PREFERRED EMBODIMENTS

Reference will now be made in detail to presently preferred compositions or embodiments and methods of the invention, which constitute the best modes of practicing the invention presently known to the inventors.

Figure 1:
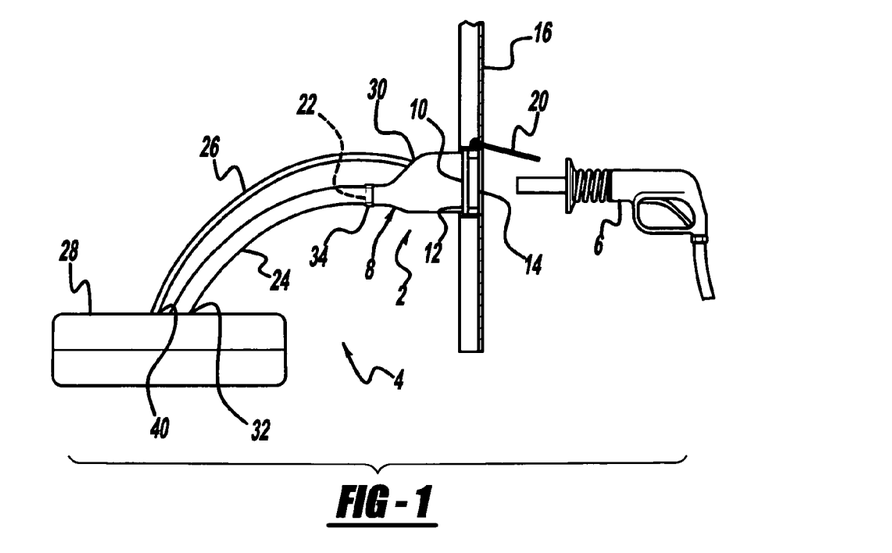
FIG. 1 is a schematic view of a fuel tank filler neck with integral threads incorporated in an automobile fuel tank system according to the present invention.

With reference to the drawings, a schematic of an embodiment of a filler neck 2 incorporated into an automobile fuel tank system 4 is provided. The fuel tank system 4 generally includes a filler neck 2, a filler tube 24, a fuel tank 28, and a gas cap 14, and is supported by an automobile body 16, which includes a movable cover 20 to conceal the gas cap 14.

The filler neck 2 generally includes a one-piece, seamless funnel member 8 having a tubular body. The filler neck 2 may receive a nozzle receptor 12, which is an insert adapted to receive a fuel nozzle 6 during fueling. Similar filler necks are disclosed in U.S. Pat. Nos. 6,330,893 and 6,588,454, both assigned to Shelby Enterprises Inc., and expressly incorporated herein by reference.

One-piece, seamless funnel member 8 may be made of a number of types of metals. Suitable materials include, but are not limited to, cold-rolled steel, zinc nickel, plated steel, zinc-galvanized plated steel, 300 series stainless steels such as 304 stainless steel, 400 series stainless steels such as 409 stainless steel, terne plated steel, tin plated steel, nickel plated steel, galvaneal, and aluminum. Funnel member 8 may also be made from injection molded plastics including, but not limited to, acetal glass composites, nylon glass composites, liquid crystal polymer glass composites, polyethylene, polyethylene glass composites, polypropylene, and polypropylene glass composites. The funnel member 8 may also include an anti-corrosive coating.

Figure 2:
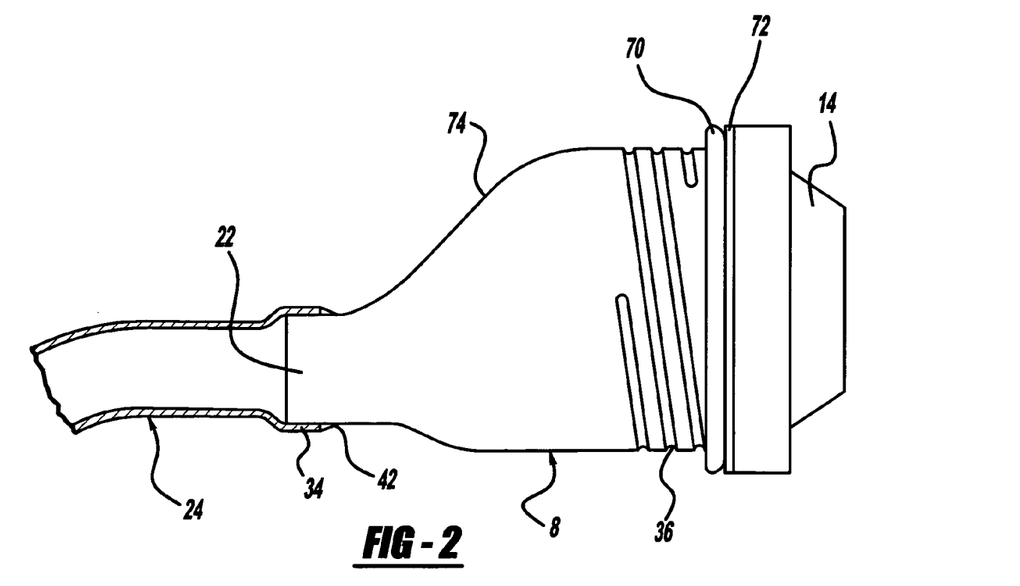
FIG. 2 is a partially sectioned side view of the fuel tank filler neck of FIG. 1 in the fuel tank system.

With reference to FIGS. 1 and 2, the funnel member 8 is defined at one end by an inlet opening 10 adapted to receive the gas cap 14, which screws directly into threads 36 integrally formed in the funnel member 8. The threads 36 may be screw, quarter-turn, eighth-turn or quick-turn configurations, or another known thread configuration.

An opposite end of the funnel member 8 is defined by an outlet opening 22, which is coupled to a first end 34 of the filler tube 24 via a brazed joint 42. At a second end 32, the filler tube 24 is coupled to the fuel tank 28 to provide fluid communication with the funnel member 8. The gas cap 14, which seats against a rolled-over sealing surface 70 formed about the inlet opening 10, may include a seal 72 to prevent fuel or vapor loss between the gas cap 14 and the funnel member 8.

The fuel tank system 4 may also include a vent tube 26, which connects to the funnel member 8 at funnel vent opening 30 and to the fuel tank 28 at fuel tank opening 40. Vent opening 30 may either be pierced in the funnel member 8 after it is drawn or it may be incorporated in the sheet stock before the funnel member 8 is drawn. The vent tube 26 allows displaced vapors in the fuel tank 28 to be vented during fueling. The vent tube 26 may be replaced by a system that recirculates the fuel vapor. Such systems are known to individuals skilled in the art.

During fueling, the gas cap 14 is removed and the fuel nozzle 6 is inserted through the inlet opening 10. Fuel flows from the fuel nozzle 6 and through the funnel member 8, the configuration of which induces a swirling motion to the fuel as the fuel flows towards the filler tube 24 and fills the fuel tank 28. More specifically, the offset axial relationship of the inlet opening 10 and the outlet opening 22 causes supplied fuel to impinge sidewall 74 of the funnel member 8, whereby fuel spirals as it flows toward the filler tube 24. The swirling motion of the fuel created by the funnel member 8 causes a suctioning effect or liquid seal that prevents fuel vapors from escaping into the atmosphere during refueling. The swirling motion of the fuel also creates a central void that allows any pressure buildups created during refueling to vent, thereby preventing premature shutoff of the fuel nozzle 6.

Figure 3:
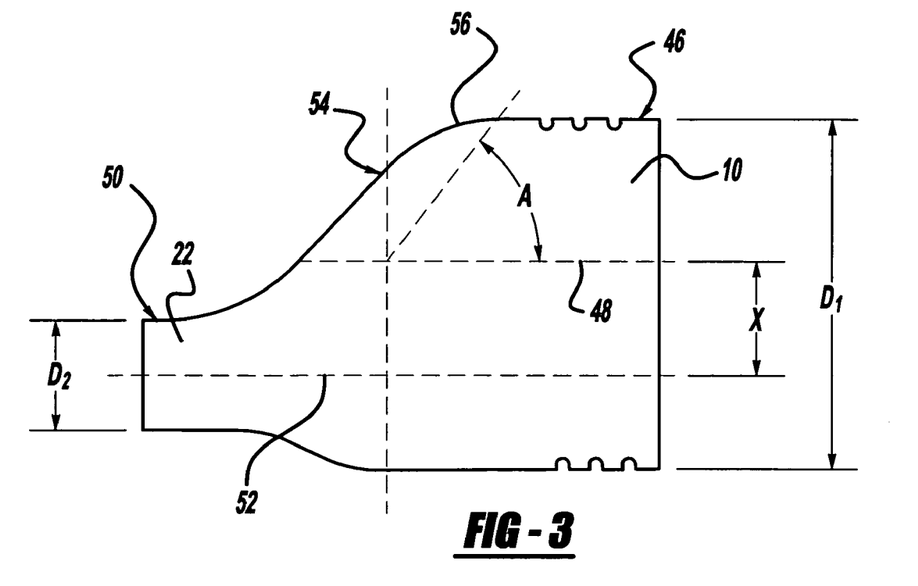
FIG. 3 is a schematic dimensional view of the filler neck as a funnel member according to the present invention.

With reference to FIG. 3, a relatively larger diameter section 46 forming the inlet opening 10 is arranged about an axis 48 and spaced-apart axially offset therefrom is a relatively smaller diameter tubular section 50 arranged about an axis 52 forming the outlet opening 22. As shown, the axis 48 and axis 52 are parallel, but can be positioned divergently. The larger diameter section 46 and the smaller diameter tubular section 50 are connected to one another by a tapered section 54 that transitions from the larger diameter section 46 to the smaller diameter tubular section 50. The tapered section 54 intersects the larger diameter section 46 at an elliptically shaped junction 56 that lies in a plane inclined at angle A, which is 60–85° from the axis of the tubular sections 46, 50. The inlet opening 10 may have a diameter $D_1$ of approximately 60 mm and the tubular section may have a diameter $D_2$ of approximately 25 mm with a coaxial offset at a distance X of approximately 15 mm. The relationship of the inlet opening 10 and the outlet opening 22 and the configuration of the tapered section 54 cause the fuel to swirl during fuel filling.

Figure 4:
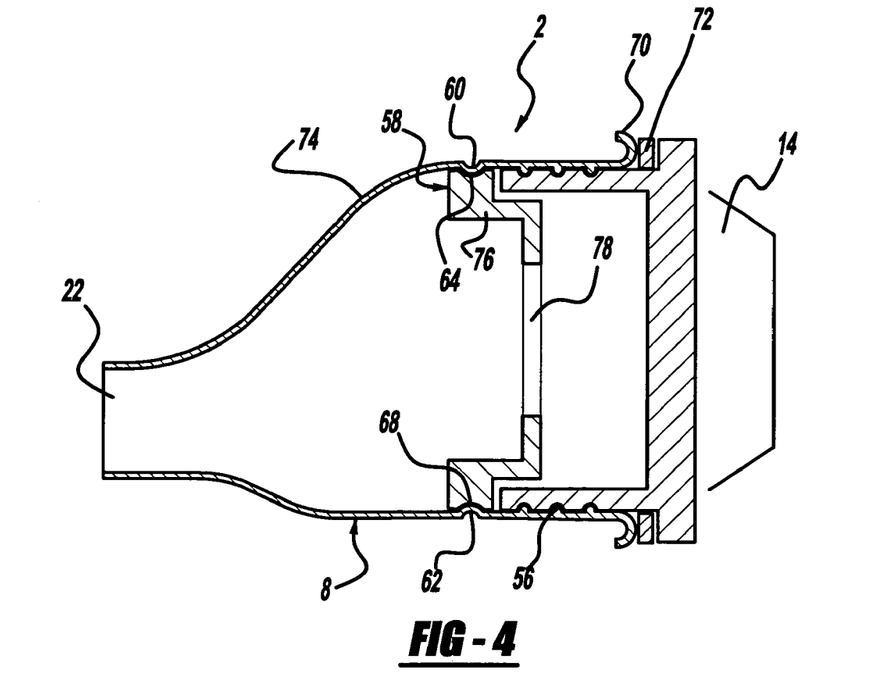
FIG. 4 is a cross sectional view of the fuel tank filler neck according to the present invention with a gas cap engaged thereby.

With reference to FIG. 4, a view of the filler neck 2 with the gas cap 14 screwed in is illustrated. The inlet opening 10 is defined in part by the rolled-over sealing surface 70 of the filler neck 2, which provides a sealing surface against which the gas cap 14 seals when threaded into the threads 36. The seal 72 may be positioned between the gas cap 14 and the sealing surface 70, or made part of the gas cap 14. For this arrangement, the nozzle receptor 12 includes a body 76 defining an opening 78 and seats within the filler neck 2 to receive and position the fuel nozzle 6. As shown, the nozzle receptor 12 is held in position by crimps 60, 62 projecting against indentations 64, 68 to secure the nozzle receptor 12 in the filler neck 2.

Figure 5:
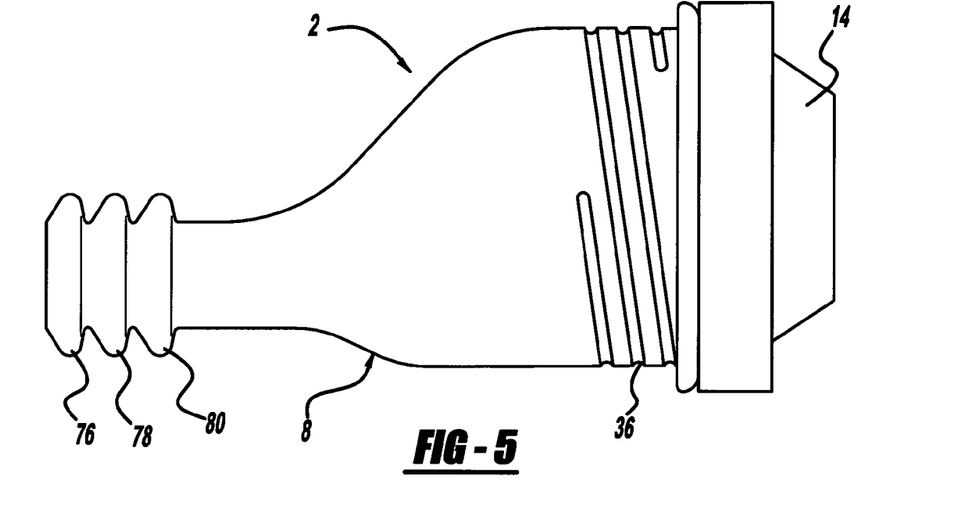
FIG. 5 is a cross sectional view of a fuel tank filler neck with a barbed end according to the present invention.
Figure 6:
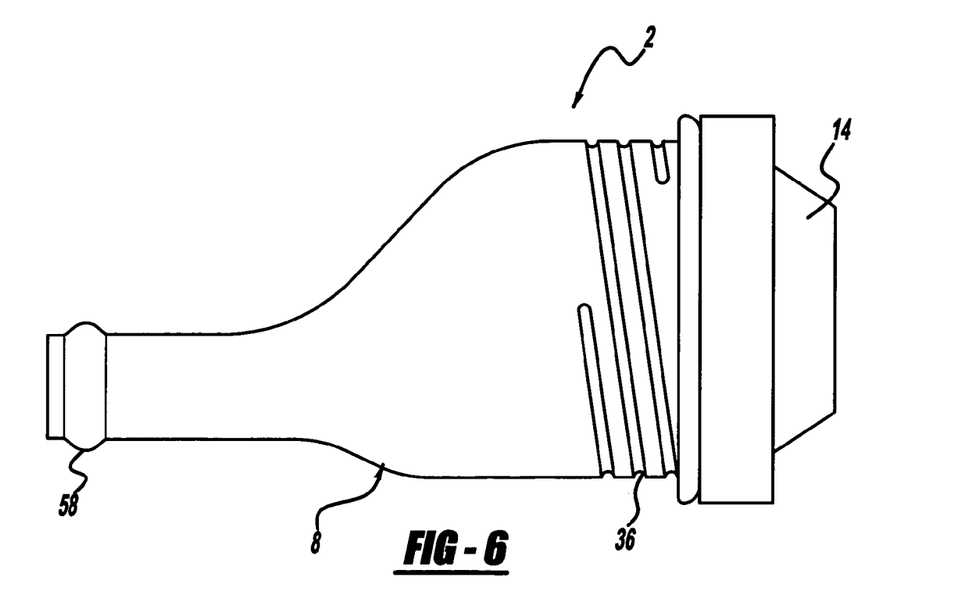
FIG. 6 is a cross sectional view of a fuel tank filler neck with a hose bead according to the present invention.

With reference to FIG. 5, the filler neck 2 includes barbs 76, 78, 80 formed in smaller diameter tubular section 50, thereby facilitating connection to the filler tube 24. With reference to FIG. 6, the filler neck 2 includes a hose bead 58 formed in smaller diameter tubular section 50, similarly facilitating connection to the filler tube 24, particularly one made of plastic or rubber.

The fuel tank filler neck of this invention may be made by a number of processes which include eyelet/progressive stamping, eyelet stamping, progressive die stamping, transfer die stamping, and hydroforming. If the fuel tank filler neck is made of plastics, injection molding and compression molding are suitable methods for manufacturing the fuel tank filler neck.

The method of manufacturing the filler neck 2 will now be described with reference to the drawings. The filler neck 2 for motor vehicle fuel tank system 4 is formed by deep-drawing a seamless funnel member 8 having a relatively larger inlet opening 10 at one end and a relatively smaller outlet opening 22 at an opposite end. A portion of the filler neck 2 is configured to induce a sufficient swirl to create a hollow passage for suctioning fuel vapors into the fuel tank 28 and to allow venting of any pressure buildup in the fuel tank 28 during fueling. A length of butt-seam tubing is cut to form the filler tube 24 of desired length. An end of the filler tube 24 is aligned with the outlet opening 22 of the funnel member 8 and joins the funnel member 8 and the filler tube 24 together. The filler tube 24 is bent to a desired shape and the nozzle receptor 12 is attached to the funnel member 8 adjacent funnel inlet opening 10. The configuration may be leak tested to verify the integrity of joining the funnel member 8 to tubular member 24 and the attachment of nozzle receptor 12 to the funnel member 8, and the integrity of the butt-seam joint 42 and the tubular member 24. The funnel member 8 is attached to the tubular member 24 by braising, adhesive bonding, or welding.

Figure 7A:
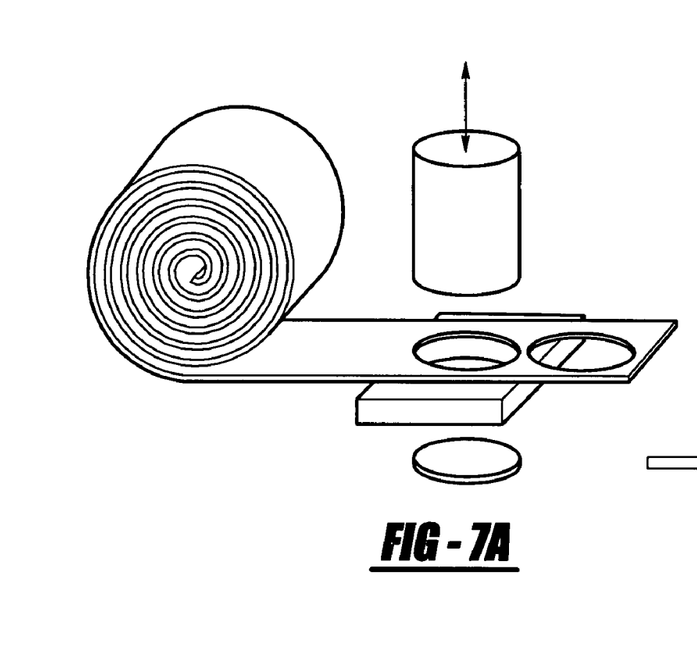
FIGS. 7a–7i are schematic illustrations of the method for making a fuel tank filler neck according to the present invention.
Figure 7B:
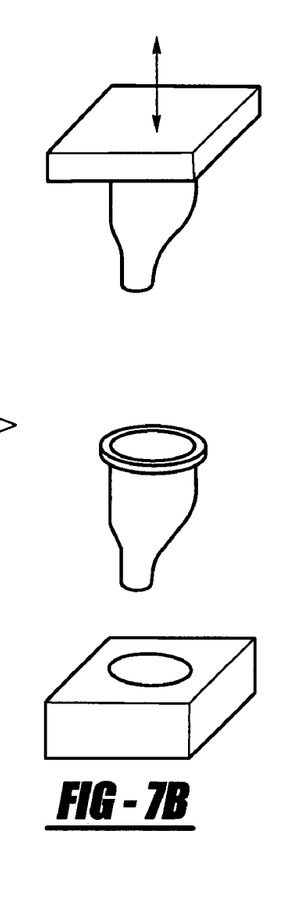
Figure 7C:
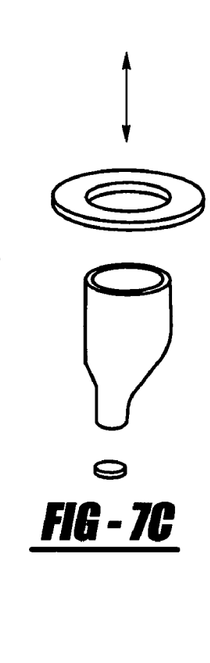
Figure 7D:
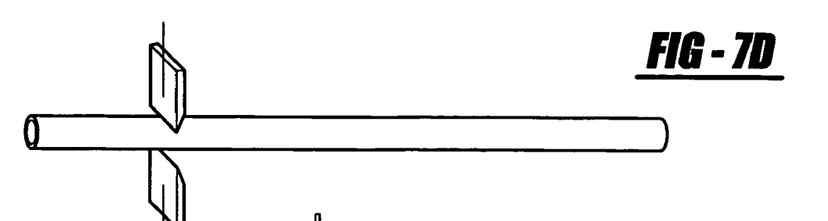
Figure 7E:
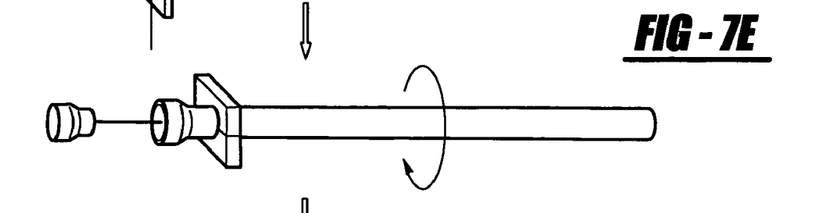
Figure 7F:
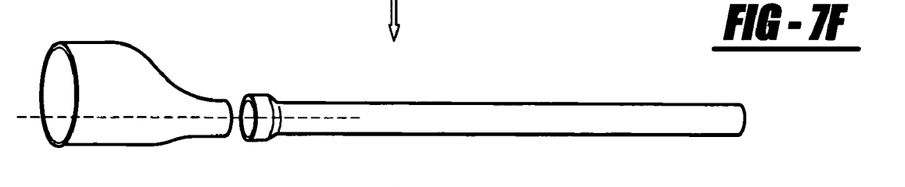
Figure 7G:
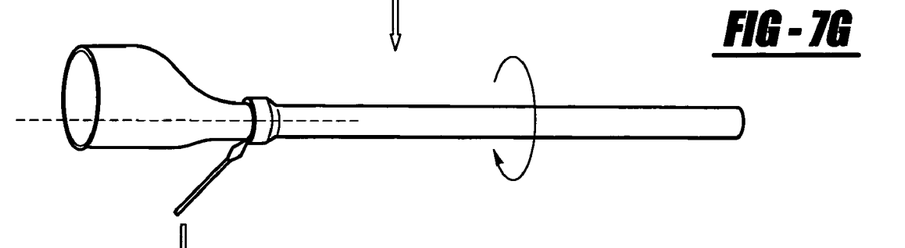
Figure 7H:
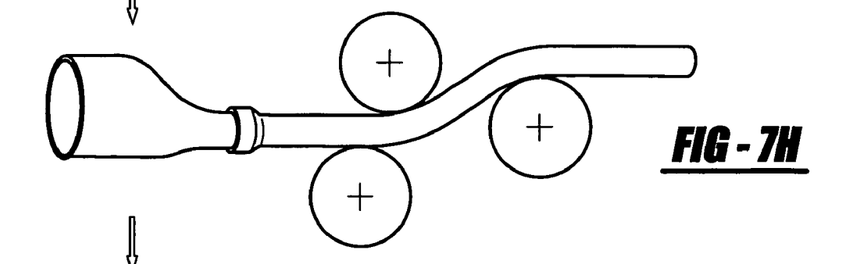
Figure 7I:
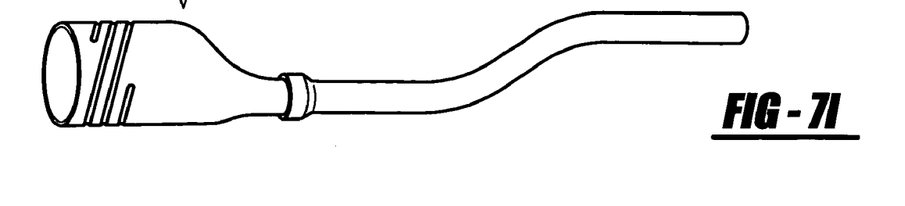

With reference to FIGS. 7*a*–7*i*, schematic illustrations of the method for making the filler neck 2 and attaching the filler tube 24 are provided. In FIG. 7*a*, sheet stock is formed into a circular blank that is drawn into a funnel shape in FIG. 7*b*. The drawing method may include several dies in which the funnel is progressively formed into the desired funnel shaped. The ends of the funnel shape are trimmed in FIG. 7*c* to remove excess stock and thereby form the funnel member 8. In FIG. 7*d*, pipe stock is cut to desired length to form the filler tube 24, which is then at the ends in FIG. 7*e* in order to provide an attachment mechanism to the funnel member 8. The filler tube 24 and the funnel member 8 are aligned in FIG. 7*f* and brazed or welded together in FIG. 7*g*. The funnel member 8 and the filler tube 24 assembly is bent in FIG. 7*h*. The threads 36 are formed into the funnel member in FIG. 7*i*.

Figure 8:
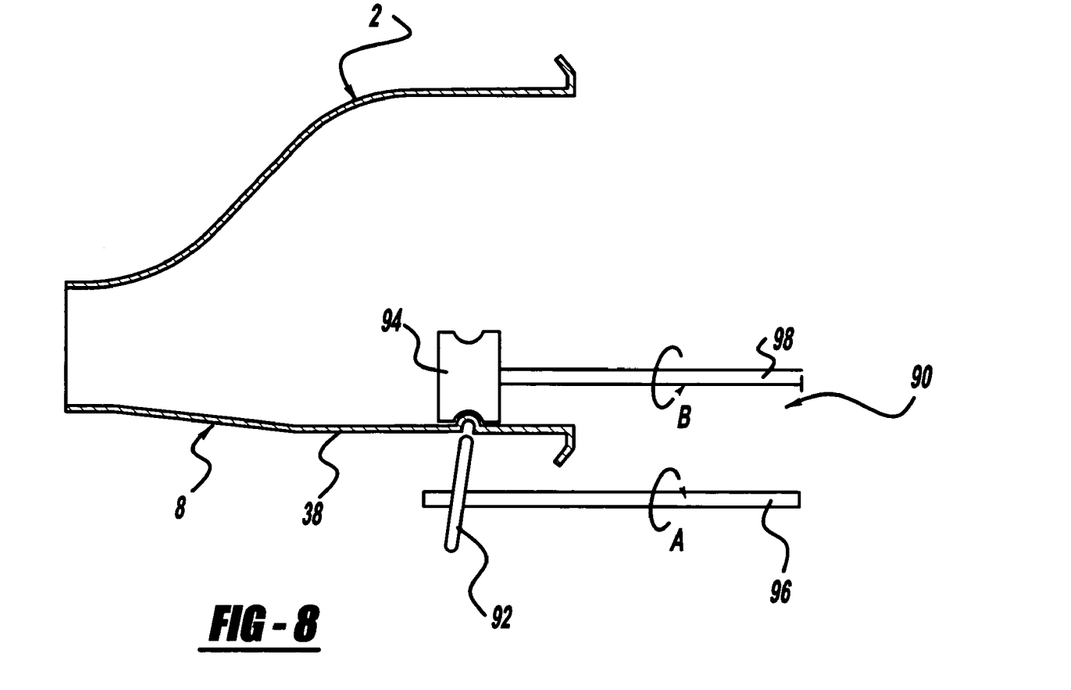
FIG. 8 is a schematic view of a method of forming threads in the fuel tank filler neck according to the present invention.

With reference to FIG. 8, a method of forming the threads 36 in the funnel member 8 is provided. The threads 36 are made by a forming tool 90 including wheels 92, 94, which in combination are of appropriate shape to form the threads 36 in the sidewall 38 of the funnel member 8. The wheels 92, 94, which are mounted on shafts 96, 98, spin in directions A, B as they press on the sidewall 38 to form the threads 36. This spinning allows forming tool 90 to form the periphery of the funnel member 8 about the inlet opening 10.

Figure 9:
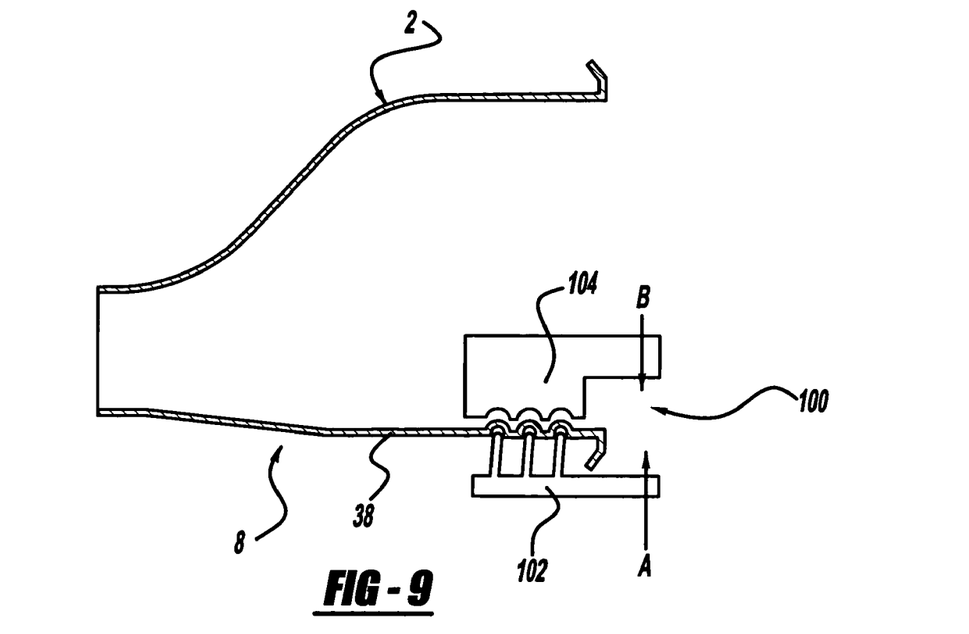
FIG. 9 is a schematic view of another method of forming threads in the fuel tank filler neck according to the present invention.

With reference to FIG. 9, another method of forming threads in the funnel member 8 is provided. The threads 36 are made by a crimping tool 100, which includes crimping halves 102, 104. The sidewall 38 is placed between crimping halves 102, 104, which are pressed together in directions A, B to form the threads 36. This process is repeated along the sidewall 38 until the threads 36 are completely formed in the funnel member 8 about the inlet opening 10.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A fuel tank filler assembly comprising a seamless funnel member having a tubular body defining an inlet having a first axis, an outlet having a second axis, and a transition portion disposed between said inlet and said outlet, said first axis being offset and parallel to said second axis and said transition portion being formed at an angle relative to said first axis and said second axis, wherein said transition portion induces a swirl to and vents vapors from fuel flowing through said tubular body.

2. The fuel tank filler assembly of claim 1, further comprising a sealing surface formed about said inlet of said tubular body.

3. The fuel tank filler assembly of claim 2, wherein said inlet is rolled to create said sealing surface.

4. The fuel tank filler assembly of claim 1, further comprising a vent tube connected to said tubular body.

5. The fuel tank filler assembly of claim 4, further comprising a fuel tank fluidly coupled to said tubular body by said vent tube.

6. The fuel tank filler assembly of claim 1, further comprising a fuel supply nozzle positioning receptor disposed in said tubular body, said positioning receptor operable to position a fuel dispenser nozzle relative to said tubular body such that fuel first contacts said transition portion when entering said tubular body.

7. The fuel tank filler assembly of claim 6, wherein said tubular body includes an attachment portion adjacent to said inlet for receiving said positioning receptor.

8. The fuel tank filler assembly of claim 1, further comprising a hose and a fuel tank, said hose fluidly connecting said outlet and said fuel tank.

9. The fuel tank filler assembly of claim 1, wherein said seamless funnel member is formed from a single piece of material.

10. The fuel tank filler assembly of claim 1, further comprising threads integrally formed in said seamless funnel member.

11. A fuel tank filler member receiving fuel from a nozzle, the fuel tank filler member comprising a seamless tubular body defining an inlet, an outlet, and a transition portion disposed between said inlet and said outlet, said transition portion formed at an angle relative to said inlet and said outlet and operable to initially receive fuel directly from an outlet of the nozzle to induce a swirl to and vent vapors from fuel flowing through said tubular body.

12. The fuel tank filler member of claim 11, further comprising a sealing surface formed about said inlet of said tubular body.

13. The fuel tank filler member of claim 12, wherein said inlet is rolled to create said sealing surface.

14. The fuel tank filler member of claim 11, further comprising a vent tube connected to said tubular body.

15. The fuel tank filler member of claim 14, further comprising a fuel tank fluidly coupled to said tubular body by said vent tube.

16. The fuel tank filler member of claim 11, further comprising a fuel supply nozzle positioning receptor disposed in said tubular body, said positioning receptor operable to position the nozzle relative to said tubular body such that fuel from the nozzle first contacts said transition portion when entering said tubular body.

17. The fuel tank filler member of claim 16, wherein said tubular body includes an attachment portion adjacent to said inlet for receiving said positioning receptor.

18. The fuel tank filler member of claim 11, further comprising a hose and a fuel tank, said hose fluidly connecting said outlet and said fuel tank.

19. The fuel tank filler member of claim 11, wherein said seamless tubular body is formed from a single piece of material.

20. The fuel tank filler member of claim 11, further comprising threads integrally formed in said seamless tubular body.

21. A fuel tank filler assembly for interaction with a nozzle, the fuel tank filler assembly comprising a seamless funnel member having a tubular body defining an inlet having a first axis, an outlet having a second axis, and a transition portion disposed between said inlet and said outlet, said first axis being offset and parallel to said second axis and said transition portion being formed at an angle relative to first axis and said second axis, wherein said transition portion receives fuel directly from an outlet of the nozzle to induce a swirl to said fuel prior to said fuel reaching said outlet.

22. The fuel tank filler assembly of claim 21, further comprising a sealing surface formed about said inlet of said tubular body.

23. The fuel tank filler assembly of claim 22, wherein said inlet is rolled to create said sealing surface.

24. The fuel tank filler assembly of claim 21, further comprising a vent tube connected to said tubular body.

25. The fuel tank filler assembly of claim 24, further comprising a fuel tank fluidly coupled to said tubular body by said vent tube.

26. The fuel tank filler assembly of claim 21, further comprising a fuel supply nozzle positioning receptor disposed in said tubular body, said positioning receptor operable to position the nozzle relative to said tubular body such that fuel from the nozzle first contacts said transition portion when entering said tubular body.

27. The fuel tank filler assembly of claim 26, wherein said tubular body includes an attachment portion adjacent to said inlet for receiving said positioning receptor.

28. The fuel tank filler assembly of claim 21, further comprising a hose and a fuel tank, said hose fluidly connecting said outlet and said fuel tank.

29. The fuel tank filler assembly of claim 21, wherein said seamless funnel member is formed from a single piece of material.

30. The fuel tank filler assembly of claim 21, further comprising threads integrally formed in said seamless funnel member.

* * * * *